United States Patent [19]

Norris

[11] Patent Number: 5,488,444
[45] Date of Patent: Jan. 30, 1996

[54] CAMERA BACK ADAPTER AND METHOD

[75] Inventor: Philip R. Norris, North Reading, Mass.

[73] Assignee: Polaroid Corporation, Cambridge, Mass.

[21] Appl. No.: 302,220

[22] Filed: Sep. 8, 1994

[51] Int. Cl.$^6$ ................................................ G03B 17/50
[52] U.S. Cl. ........................................................ 354/83
[58] Field of Search ............................ 354/83, 276, 282, 354/283

[56] References Cited

U.S. PATENT DOCUMENTS

| | | |
|---|---|---|
| 1,648,525 | 11/1927 | Wittel . |
| 3,616,734 | 11/1971 | Inoue .......................... 95/11 |
| 4,348,086 | 9/1982 | Forscher ..................... 354/83 |
| 4,505,560 | 3/1985 | Kozai ......................... 354/86 |
| 4,531,818 | 7/1985 | Bally ......................... 354/83 |
| 4,568,163 | 2/1986 | Czumak et al. ............. 354/88 |
| 5,258,794 | 11/1993 | Woltz et al. ............... 354/275 |
| 5,292,612 | 3/1994 | Polizzotto et al. ......... 430/207 |

*Primary Examiner*—Monroe H. Hayes
*Attorney, Agent, or Firm*—Leslie Payne

[57] ABSTRACT

An adapter attachable to an image recording apparatus and operable for removably receiving therein a film cassette assembly including a film unit to be exposed by the image recording apparatus. The adapter includes a protective shield which normally protects an aperture of the image recording apparatus and which advances to an unblocking condition upon insertion of the film cassette assembly so as to allow exposure of a film unit in the cassette by the image recording apparatus. Upon removal of the film cassette assembly, the protective shield advances to its blocking condition, whereby the image recording apparatus is protected. The adapter also includes a mechanism for actuating the cassette assembly during insertion for allowing exposure of a film unit when the shield is in the unblocking condition, and for terminating exposure upon removal of the film cassette. In one embodiment, there is provided a releasable locking device for releasably locking the transport assembly in the adapter.

13 Claims, 10 Drawing Sheets

CAMERA BACK ADAPTER AND METHOD

CROSS-REFERENCE TO RELATED APPLICATION

The present application relates to copending and commonly assigned U.S. patent application Ser. No. 08/302603 entitled "METHOD AND APPARATUS FOR TRANSFERRING FILM" by Philip Norris et al., which application is concurrently filed herewith.

BACKGROUND OF THE INVENTION

The present invention is directed generally to film adapter apparatus mountable on photographic apparatus. More particularly, it relates to adapters and methods, wherein the adapter cooperates with a film transfer mechanism for allowing proper sequential exposure of film units that are housed thereby, while acting to protect the photographic apparatus during non-exposure modes.

A wide variety of camera backs have been proposed in the photographic arts for attachment to cameras. In general, such adapters properly locate a stack of film carried thereby for sequential exposure. In the instant or self-developing film arts, for example, it is well-known to carry the film stack in a cassette that is insertable in the camera back for facilitating exposure. Exemplary camera backs are described in the following commonly assigned U.S. Pat. Nos.: 1,648,525; 4,348,086; 4,568,163: and, 4,531,818. While known adapters, such as those indicated above, perform their functions satisfactorily, none is known to mechanically cooperate with a removable transport or shuttle mechanism that, in turn, selectively carries a film carrying cassette which is operable for sequentially exposing the film. More specifically, none of the known adapters functionally cooperate with such a shuttle mechanism so as to activate the latter for allowing sequential film exposure. Moreover, none of the adapters have blocking or curtain mechanisms operable automatically for protecting the camera in response to removal of the shuttle mechanism.

SUMMARY OF THE INVENTION

In accordance with the present invention there is provided an adapter apparatus mountable on a photographic apparatus for removably receiving a film transport or shuttle assembly which houses a cassette of the type containing a stack of self-developable film units. Included in the adapter is a housing assembly comprising an exposure aperture and a receptacle for removably receiving the transport assembly, whereby a film unit is positioned to be exposed at a focal plane through the exposure aperture. A protective blocking device is operable in a first mode for normally blocking the exposure aperture and thus protecting the photographic apparatus. The blocking device is operable in a second mode, in response to insertion of the transport assembly in the receptacle, to unblock the exposure aperture and allow film unit exposure. The blocking device returns to the first mode to reblock and protect the aperture upon transport assembly removal from the receptacle. The adapter includes an actuating mechanism for actuating a dark slide of the transport assembly during insertion and removal of the latter.

In an illustrated embodiment, the blocking device includes a slidable curtain arrangement mounted for movement between positions corresponding to the first and second modes of the blocking device. Provision is made for engaging means coupled to the curtain arrangement for being engaged by a leading end portion of the transport assembly upon the latter's insertion to move the curtain arrangement to the second mode; and, biasing means for normally biasing the engaging means and the curtain arrangement to the first mode upon removal of the transport assembly.

In an illustrated embodiment, the actuating mechanism includes projecting means mounted on the adapter housing assembly and projecting into the path of movement of the transport assembly during movement of the latter into and from the receptacle.

In still another embodiment, the curtain arrangement includes a plurality of interconnected blade segments which are mounted on the housing assembly adjacent the aperture and connected to each other for allowing individual sliding reciprocation therebetween.

Among the other objects of the present invention are, therefore, the provision of an apparatus which is adaptable to photographic apparatus so as to present individual film units at a focal plane of the photographic apparatus; the provision of an adapter apparatus of the foregoing type which is adaptable to receive a film transport or shuttle assemblage that includes a film cassette holding a stack of film for sequential exposure; the provision of an adapter apparatus which cooperates with and activates the film transport assembly so as to allow exposure of single ones of the film units when the transport is received in the adapter; the provision of such an adapter for protecting the photographic apparatus when the adapter is not in use. Also included is a method which adapts a photographic apparatus to sequentially expose a stack of film units carried in a film cassette housed in a film transport assembly while protecting the apparatus.

These and other objects and features and the invention itself will become apparent from the following description when taken in conjunction with the accompanying drawings wherein like structure throughout the several views are indicated by like reference numerals.

DETAILED DESCRIPTION

Figure 1:
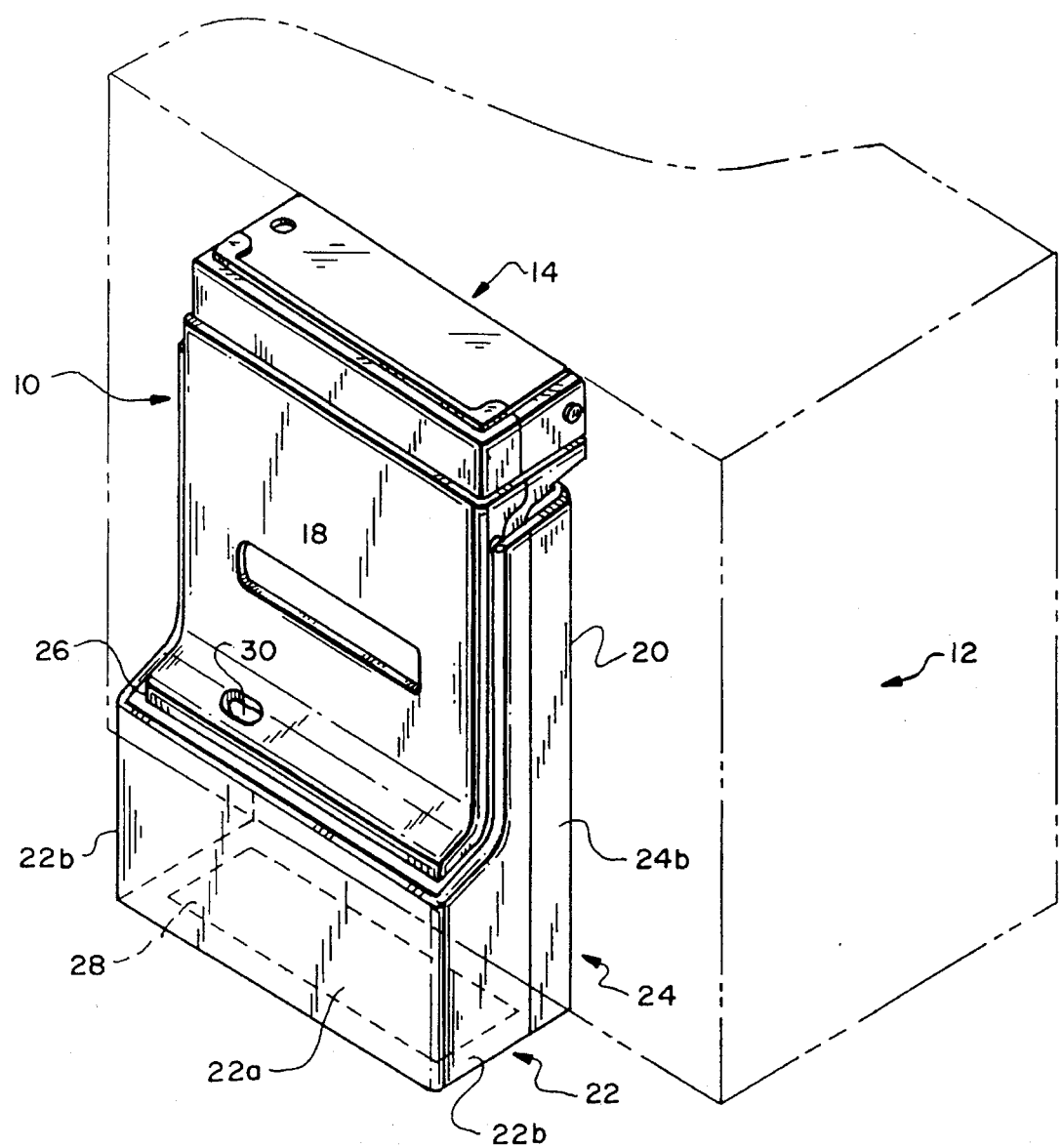
FIG. 1 is a front perspective view of an adapter apparatus of this invention cooperating with a film shuttle mechanism.
Figure 2:
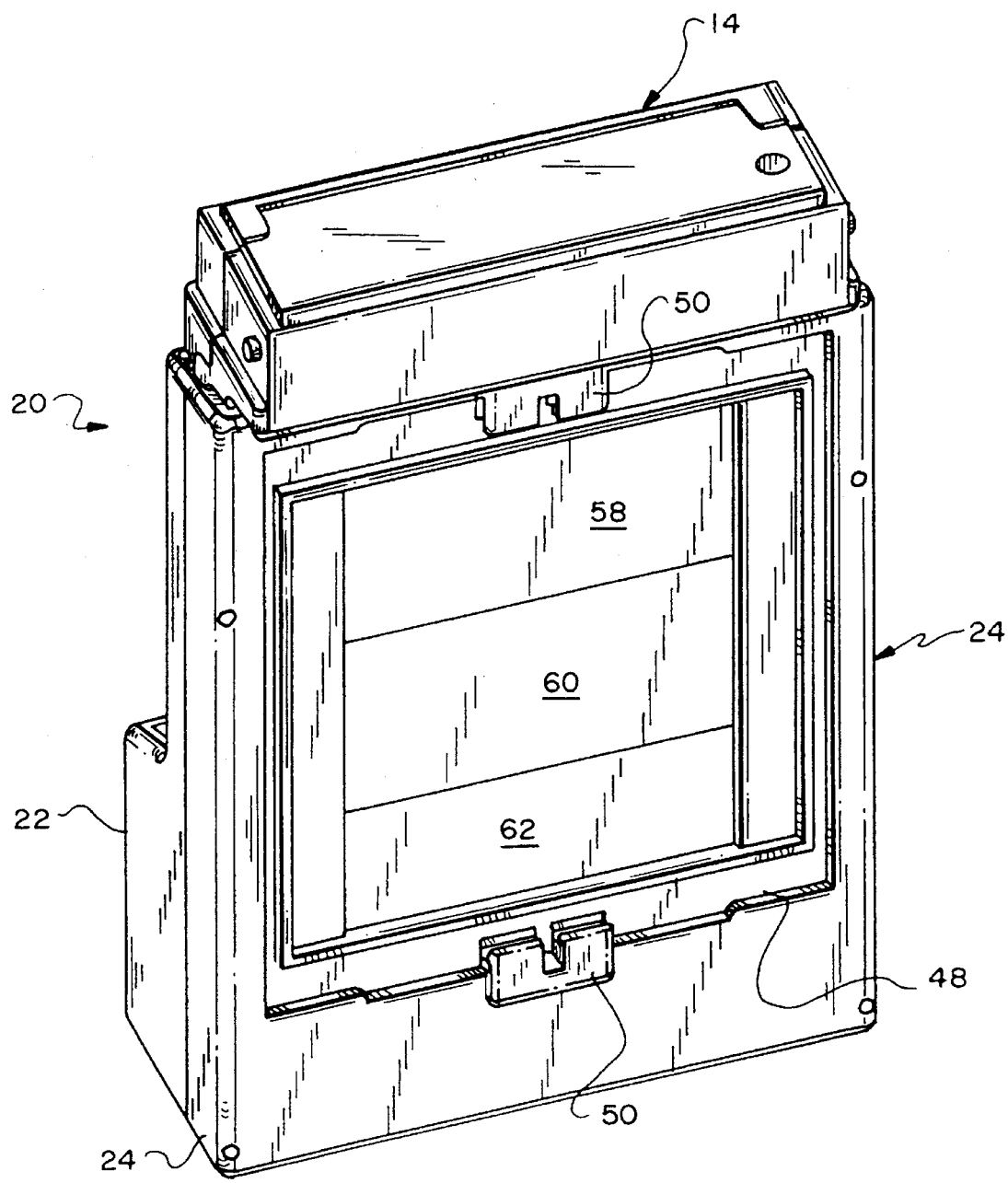
FIG. 2 is a rear perspective view of the adapter of FIG. 1, illustrating a protective curtain in a fully closed position.
Figure 3:
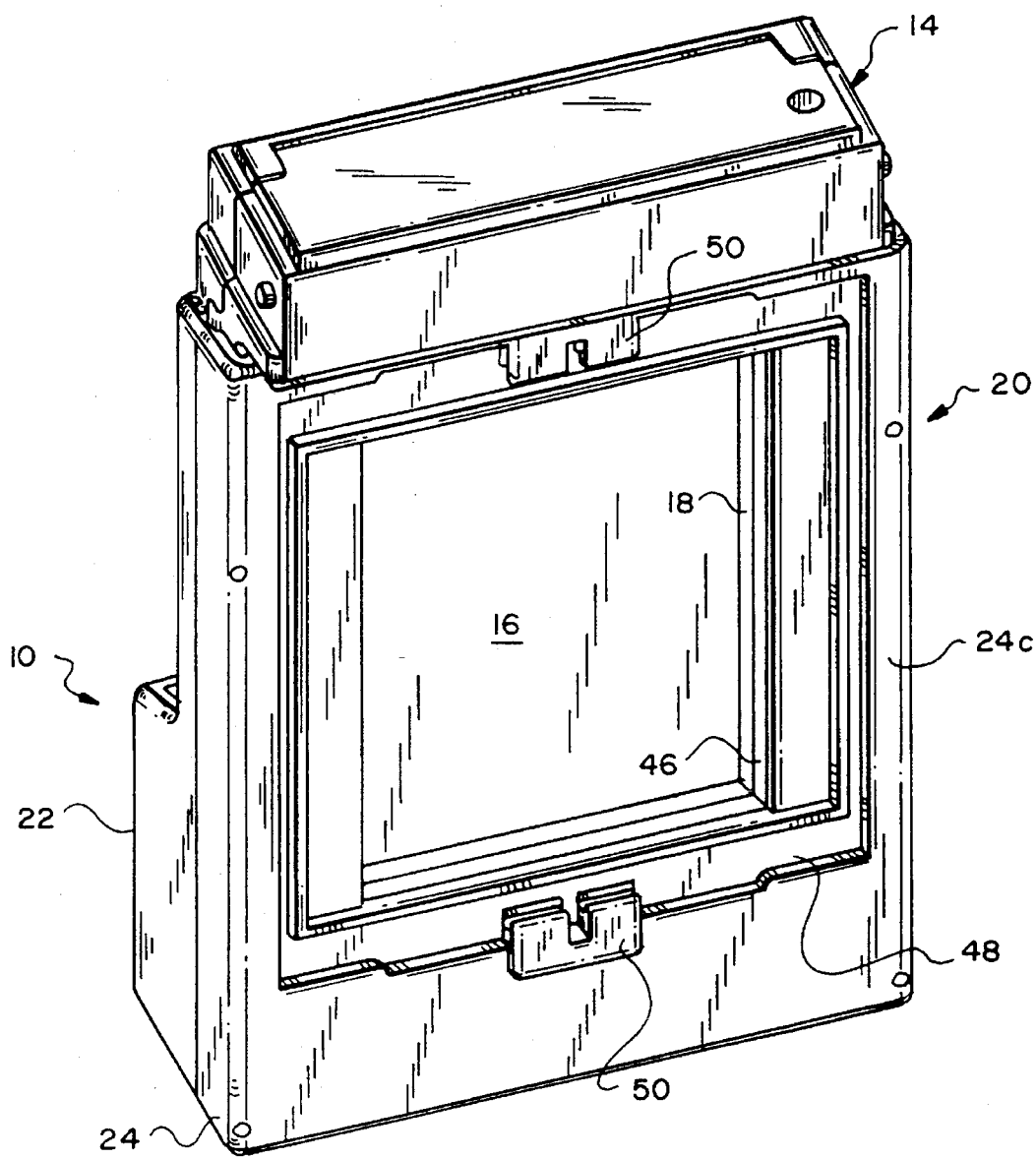
FIG. 3 is a perspective view of the adapter similar to FIG. 2, but illustrating the protective curtain in a fully open condition.

Reference is made to FIGS. 1–8 for illustrating one preferred embodiment of an adapter apparatus 10 that is detachably securable to an image recording device, such as a self-developing type camera 12. An example of the camera is a Model 201 miniportrait kind that is commercially available from Polaroid Corporation, Cambridge, Mass., USA. It will be understood that the adapter 10 is adaptable to other image recording devices, such as electronic imaging apparatus. The adapter 10 functionally cooperates with a transport or shuttle assembly 14 in order to activate the latter for allowing sequential exposure of a stack of film units one of which is shown (FIG. 3). The film units can be of the self-developing type and are normally stacked in a film cassette 18 of the kind used with self-developing film. Such a cassette defines an aperture (FIG. 3) which is registrable with an aperture of the transport assembly as well as defines an ejection slot, not shown, for permitting ejection of an exposed film unit into the processor in a manner which will be described. In turn, such cassette and transport apertures are registered with an exposure aperture of the adapter for allowing exposure of the film unit when the apertures are unblocked. These film units can, preferably, be like that described in commonly assigned U.S. Pat. No. 5,292,612 issued Mar. 8, 1994. However, the present invention is not limited to self-developing film units. The cassette 18 is removably housed in the shuttle assembly 14 for facilitating transportation by an operator from the camera, whereat the units are exposed, one at a time, to a processor (not shown) whereat each exposed unit is removed for processing. The shuttle assembly 14 does not, per se, form an aspect of the present invention, but it is described and claimed more fully in copending and commonly assigned U.S. patent application Ser. No. 08/302603, entitled "METHOD AND APPARATUS FOR TRANSFERRING FILM", which application has been filed. Accordingly, only those details of the shuttle necessary for understanding the adapter will be presented herein.

Referring back to the adapter 10, it includes a housing assembly 20 having front and back sections 22 and 24; respectively, which are secured together to define an open-ended shuttle loading opening 26 and an opening 28 located opposite the loading opening. The front assembly section 22 includes front wall 22a and sidewalls 22b which extend higher and are constructed, as illustrated, to receive an enlarged bottom portion of the shuttle assembly 14. In addition, the front wall section 22a and sidewalls 22b are dimensioned and configured to allow a display window 30 on the shuttle assembly 14 to be readily visible to a user.

Figure 4:
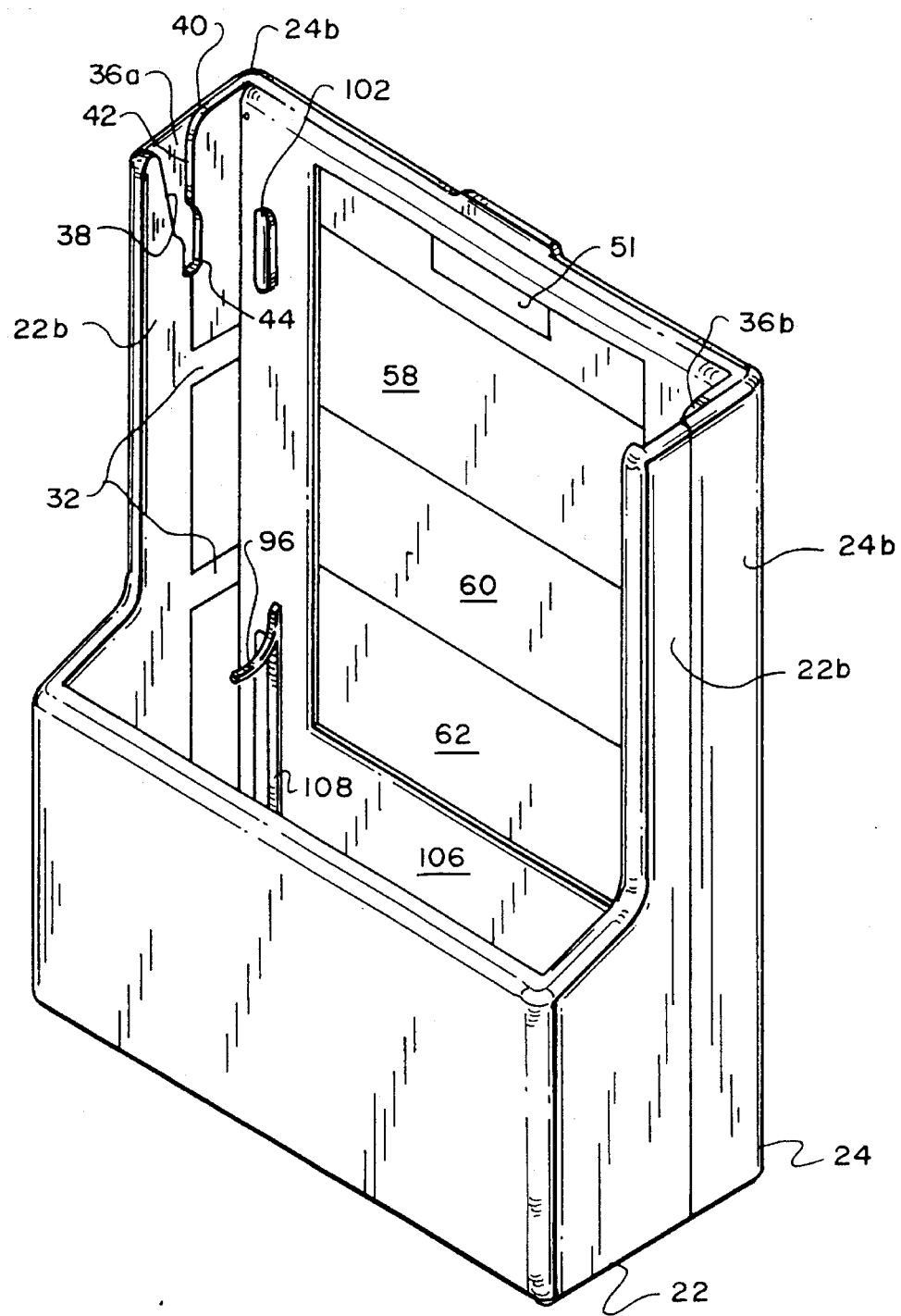
FIG. 4 is a perspective view of the adapter but without the shuttle mechanism being received therein.
Figure 5:
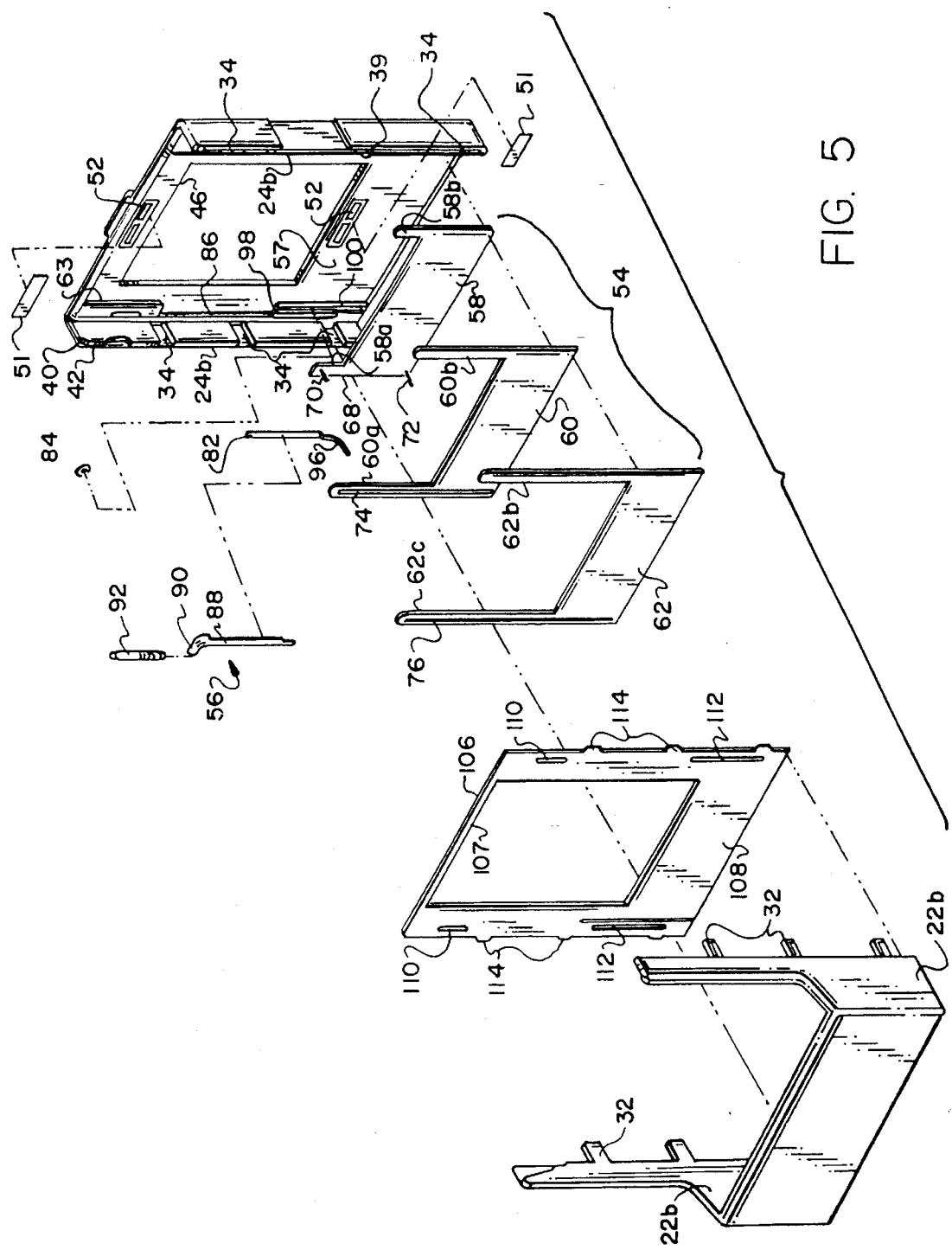
FIG. 5 is an exploded perspective view of the adapter.

As illustrated in FIGS. 4 and 5, the front section 22 includes a plurality of projections 32 on each sidewall 22b which are vertically spaced and shaped to be slidably retained within corresponding ones of complementary configured lateral grooves 34 spaced along the internal sidewalls 24b. A pair of oppositely facing and matching camming grooves 36a, 36b are formed by respective mating sidewalls 22b and 24b of the front and back sections. In particular, the camming grooves include an inclined ramp segment 38, opposed to a curved ramp segment 40, and a straight segment 42. The ramp segments terminate in a recessed pin receiving recess 44 having, for example, the size and configuration illustrated. The recess area 44 is adapted to slidably retain therein a pin (not shown) extending from each lateral side of the shuttle 14. The recessed area is sized and shaped to hold the shuttle pin. It will be appreciated that the particular size and configuration of the camming grooves 36a, b act to control the ease and speed of manual shuttle insertion and removal as well as light tightness of the two assemblies in combination.

Reference is made to FIGS. 2 and 3 for illustrating a backwall 24c of the back section 24. The backwall 24c defines a generally rectangular exposing aperture 46 which is sized and shaped to be generally coextensive with the exposure aperture 48 formed on the shuttle assembly 14. The backwall 24c includes a known type of fitment structure generally indicated by reference numeral 48. The fitment structure is similar to other fitment structure for insuring releasable and lighttight features. A pair of generally longitudinally spaced apart mounting lugs 50 are formed in mutually confronting relationship. The lugs 50 are formed in order to detachably and slidably cooperate with complementary structure (not shown) on a photographic apparatus so as to mount the adapter 10. The fitment structure 48 forms a lighttight relationship with the miniportrait camera. A pair of opaque covers 51 are secured to the housing assembly so as to cover mold openings 52 to contribute to a lighttight relationship of the adapter.

Figure 6:
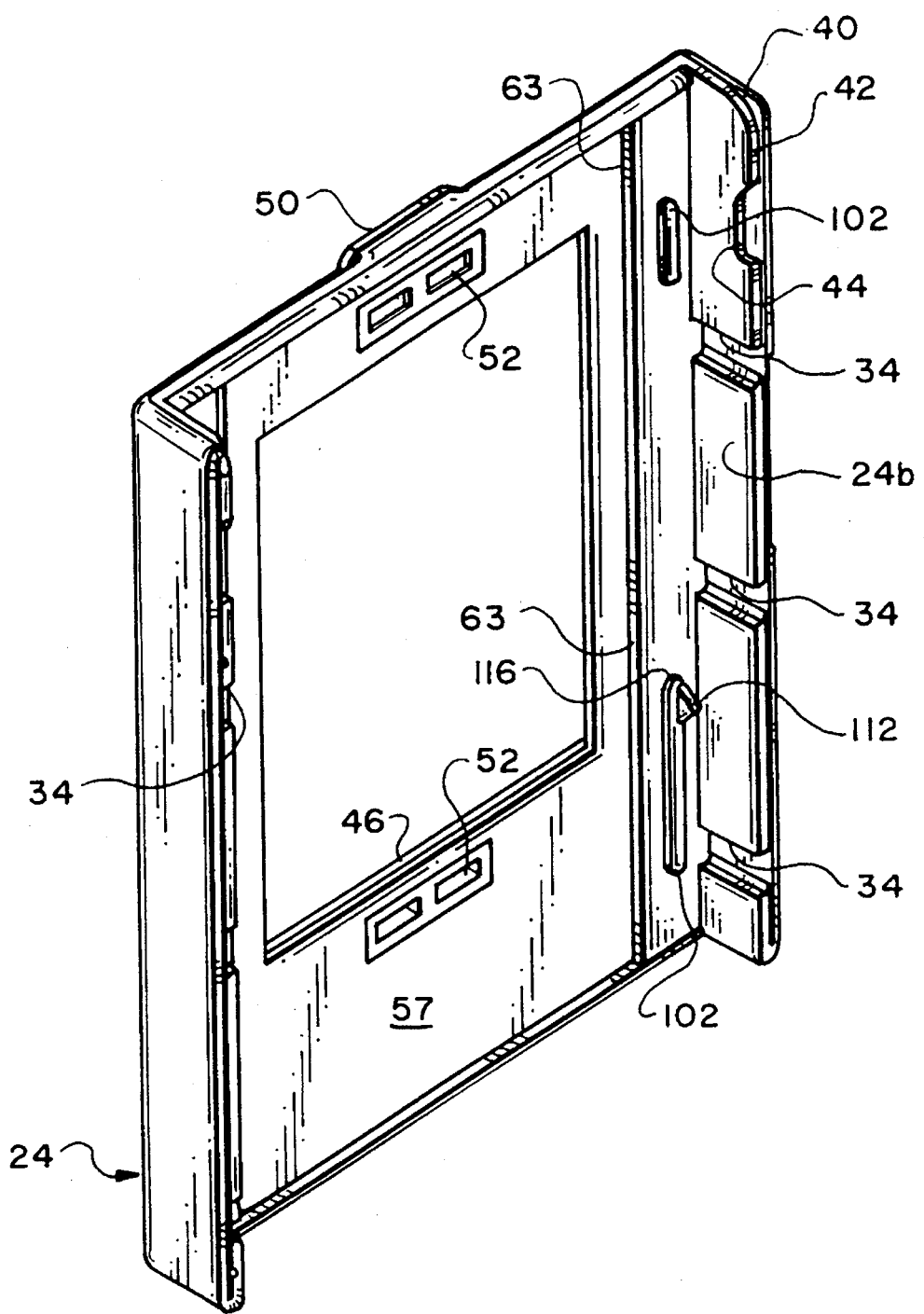
FIG. 6 is a perspective view of a cover portion of the adapter.

Reference is now made to FIGS. 5 & 6 for illustrating a blocking curtain assembly 54 which provides light blocking and dust shielding features. The blocking assembly 54 includes a spring biased actuating assembly 56, both of which are mounted for slidable movement on and relative to an interior surface 57 of the backwall 24c. As will be described, the protective blocking assembly 54 comprises a plurality of stacked and individually movable protective shields or blades 58, 60, and 62. The blades can be made of steel and are constructed and mounted for slidable movement on the surface 57 so as to move between blocking and unblocking conditions relative to the aperture 46. In the blocking condition, they perform dust sealing functions which protect the camera shuttle and lens. Each of the top, middle, and bottom blades 58–62 has a generally rectangular main body. The blade 62 has laterally extending protrusions which guide the blades for reciprocation by engaging guide segments 63. In addition, the blade 58 is formed with a pair of upstanding arms 58a, 58b. One longitudinal edge of the blade 58 is formed with a gear rack segment 68 along a portion of its longitudinal extent. A pair of vertically spaced upper and lower pin members 70, 72 are located adjacent the gear rack segment 68 and extend through elongated slots 74, 76 which are formed in the blades 60, 62; respectively. The pins are formed so that the blades can be assembled as a unit in the housing. Each of the blades 60 and 62 has upstanding arms 60a,b and 62a,b which are guided during movement by the guide surfaces 63. Referring back to the pins, the upper pin member 70 sequentially engages the upper end of the slot 74 and then slot 76 in response to an upward biasing force driving the blade 58 upwardly, as will be explained. The lower pin member 72 will sequentially engage the lower end of the slots 74 and 76 to drive the blades to their open condition as will be explained.

Referring back to the actuating assembly 56, it is illustrated as including an elongated slider hook member or means 82 which is mounted for longitudinal reciprocation on the backwall 24c. The slider hook 82 has mounted thereon a rotatable pinion gear 84 which is rotatably mounted on a shaft extending from the upper end thereof and is in meshing engagement with the gear rack segment 68 and an elongated fixed gear rack segment 86 preferably, molded to the backwall 24c. The gear arrangement can preferably provide a two-for-one ratio of movement for the blades, whereby the blades move twice the distance of the slider hook. The slider hook 82 has connected thereto an elongated cover portion 88 having a lateral tab 90 to which one end of a spring 92 is attached. The opposite end of the spring 92 is attached to an integrally formed post 94 (FIG. 7) extending from the interior surface of the backwall 24c. The spring 92 serves to normally bias the slider hook member 82 and thus the blades upwardly. The bottom or opposite end of the slider hook member 82 includes a generally arcuate shaped hook portion 96 which extends toward the interior of the adapter. The hook 96 is constructed to be selectively engaged by a leading portion of the shuttle assembly 14, whereby insertion of the latter will drive the hook 96 downwardly along a slot 98 formed by and between upstanding molded portion 100 of the backwall 24c and one of four molded cassette datum platforms 102. The datum platforms are constructed so that they position the topmost film unit of the cassette at the focal plane of the photographic camera for proper exposure. Because the pinion gear 84 has a meshed relationship with rack gear segments 68, 86 on the blade 58 and the housing; respectively, it serves to linearly advance the blades to their open or closed conditions depending on the direction of movement of the slider hook 82. The spring 92 is housed within a channel 104 formed between the interior sidewall 24b and a molded portion of the backwall 24c. Owing to the foregoing actuating assembly construction, insertion of the shuttle assembly 14 will drive the slider hook 82 downwardly from its normal biased up position, and thereby cause this slider to move downwardly. As noted in FIG. 5, the blade 58 includes a pair of upper and lower pin members. The lower pin 72 engages the bottom of the slot 74 and this drives the blade 60 downwardly. Continued movement of the slider hook 82 causes the lower pin 72 to engage the bottom of slot 76 and advance the blade 62 downwardly. The slider hook 82 continues to move until it reaches the bottom of the slot. It will be appreciated that the blades are in their open condition and thus will allow exposure of the film. Following exposure, the film shuttle 14 is removed from the adapter 10, whereupon the blocking assembly 54 will be driven to its fully closed and dust seal position. This occurs upon release of the shuttle assembly 14 from the slider hook 82. Such release will allow the spring 92 to drive the slider hook portion 82 upwardly. In this process, the pinion gear 84 is able to drive the blade 58 upwardly until it covers part of the aperture. As the blade 58 moves upwardly, the upper pin 70 moves to sequentially engage the top of the respective slots 74 and 76 so as to drive the blades 60, 62 to their fully closed positions (see FIG. 4).

A retaining cover plate 106 is provided over the stacked blades and actuator assembly, such as seen in FIGS. 5 & 6. The retaining cover plate 106 includes an aperture 107 and an elongated slot 108 which accommodates the hook and upper and lower pairs of axially spaced locating slots 110, 112 for receiving the datum platforms 102. The aperture 107 is generally coextensive with the cassette and shuttle apertures. The plate includes side portions 114 which ride in the grooves 34.

Figure 7:
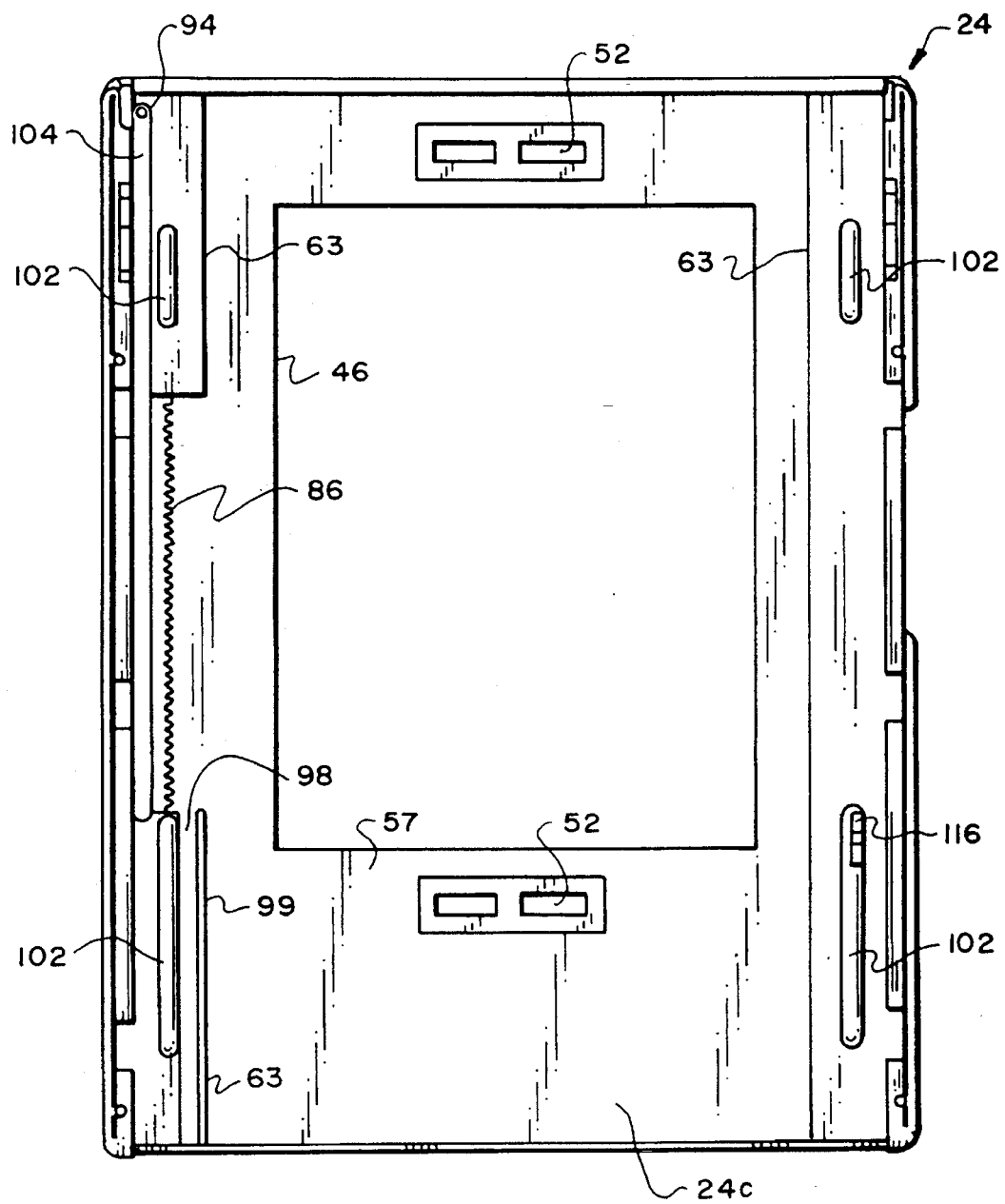
FIG. 7 is a side elevational view of the cover position shown in FIG. 6.
Figure 8:
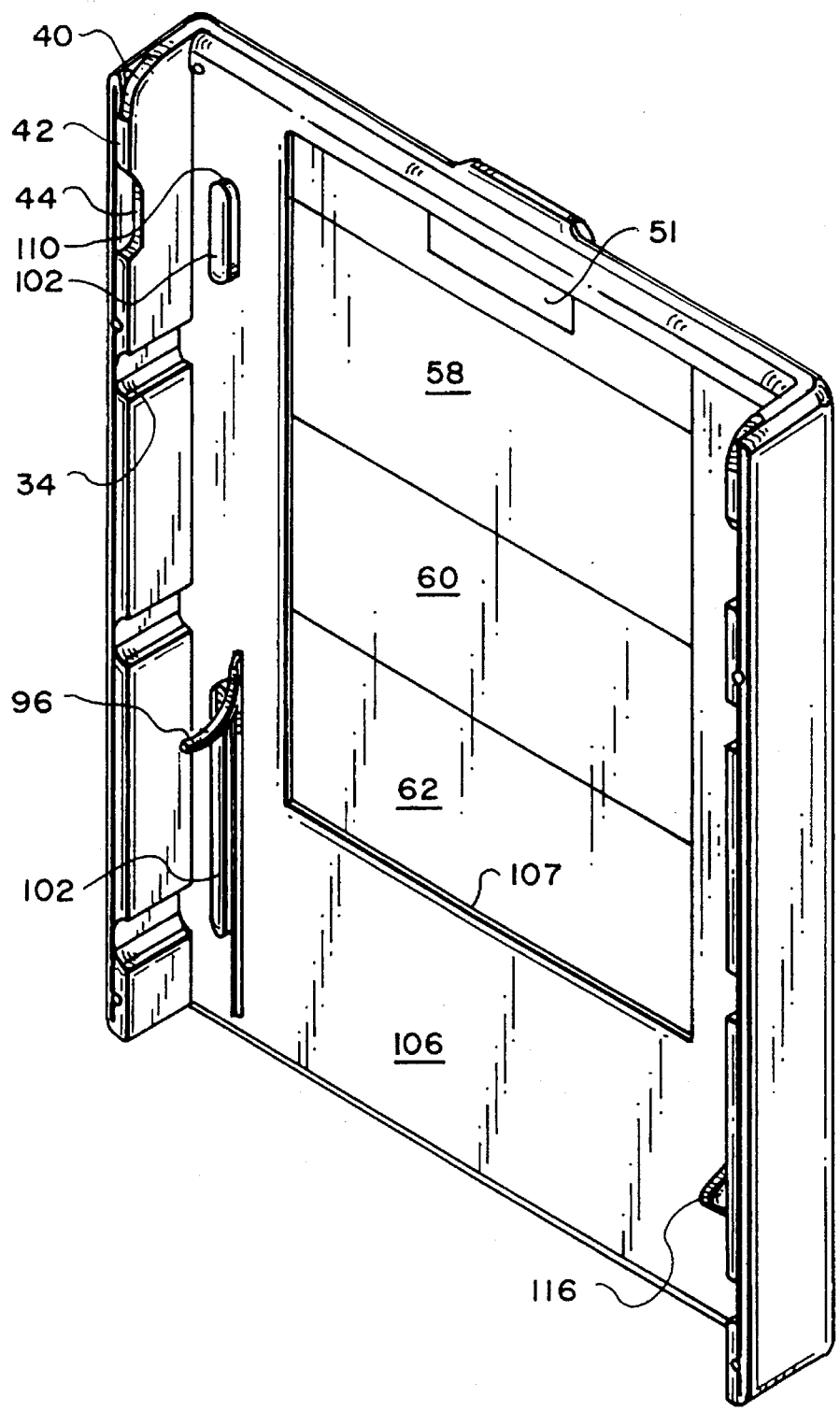
FIG. 8 is a perspective view of the cover portion illustrating the protective cover in a closed condition and a cover plate.

FIGS. 7 and 8 depict a camming actuator 116 which is preferably positioned on the top surface of one of the datums 106. The camming actuator 116 has generally wedge shaped configuration having surfaces which are adapted to engage mechanisms (not shown) within the shuttle assembly 14 so as to fire its dark slide assembly (not shown) therein to an open condition upon insertion of the shuttle assembly into the adapter. In addition, the camming actuator 116 activates the shuttle assembly mechanism to drive its dark slide assembly to its fully closed position upon removal of the shuttle assembly 14 from the adapter so as to prevent exposure of the film to light. Thus, the camming actuator 116 is positioned such that it ensures that the shuttle assembly shutter closes before it leaves the adapter in order to maintain the lighttight relationship.

After having explained the above detailed description of the adapter it is believed this operation is self-evident. However, to supplement such description, the adapter is to be mounted on a miniportrait camera 12 of the instant type. The shuttle assembly 14 is inserted into the opening 26, whereupon the leading edge of the shuttle assembly can engage the hook 96. Continued insertion of the shuttle assembly forces the hook downwardly to the bottom of its slot 108. In the process, the pinion gear 84 acts to drive the blade gear segment 68 downwardly. Because of the noted pin and slot arrangement between the stacked blades 58–62, the latter are sequentially moved to their fully open position against the bias of the spring 92. This movement occurs during shuttle removal, whereby the spring 92 will be free to drive the hook slide 82 upwardly and cause the blade 58 to also move upwardly because of the meshing engagement of the gear 84 with the gear segments 68 and 86. Such movement will continue until the blades are fully closed. In this regard, the dust cover shield is in an appropriate position to protect the aperture 46 as well as, of course, the miniportrait camera.

Although not illustrated, the invention contemplates use of a foldable and biased opaque curtain instead of the movable blades. In this regard, the foldable curtain has a folded portion that is engageable by a leading end of the shuttle. As the shuttle is inserted into the adapter it engages the biased fold and causes the curtain to unfold and thus open the aperture. Retraction of the shuttle allows a spring biasing force to refold the curtain to a closed condition.

Reference is now made to FIGS. 9–12 which illustrate another embodiment of an adapter 200 which cooperates with a shuttle assembly 202. Both the adapter and the shuttle are similar to those described earlier, but with certain changes made. Basically, the adapter has added thereto a releasable locking assembly 204 automatically lockable to the shuttle 202 so as to restrain undesired withdrawal movement of the latter. The locking assembly is released by an operator pressing a releasing 206 button assembly on the adapter 200 which releases an escapement mechanism 208 in the shuttle, thereby freeing the shuttle for withdrawal.

Figure 9:
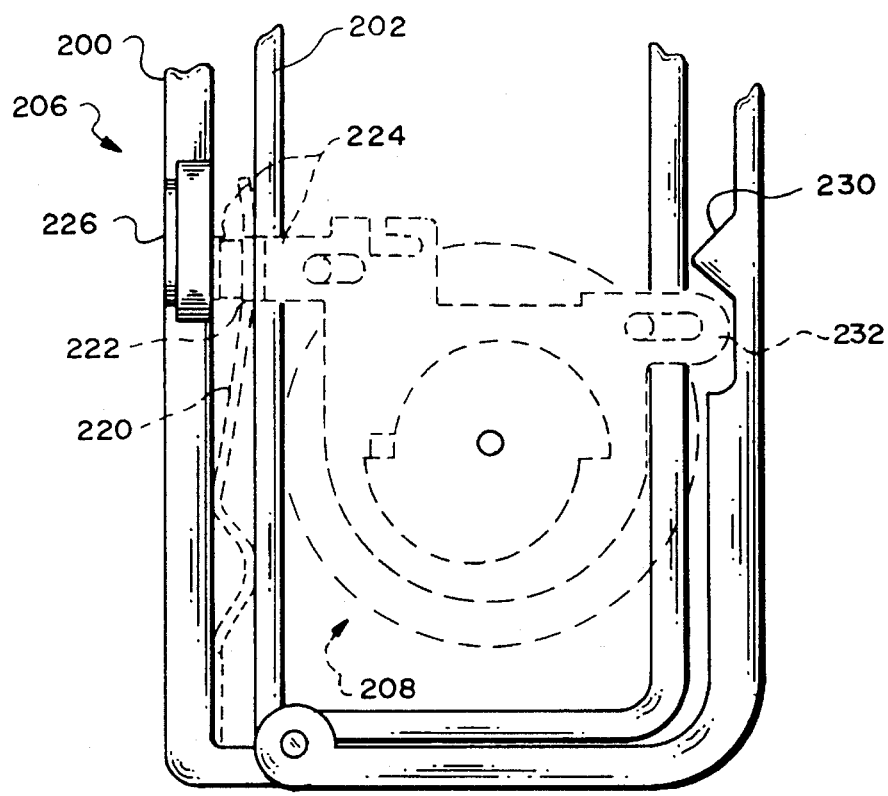
FIG. 9 is a schematic side elevational view of another embodiment of the shuttle assembly in operative relationship with a photographic apparatus adapter having a button locking assembly, wherein certain components have been omitted for purposes of clarity.
Figure 10:
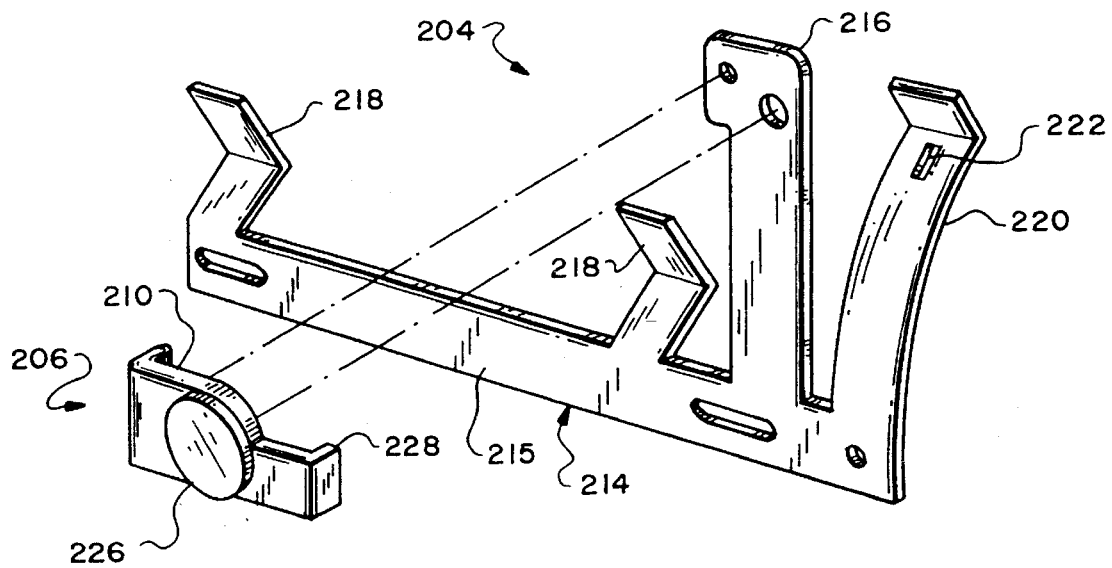
FIG. 10 is an enlarged perspective view of a locking device used in the adapter for cooperating with the shuttle for holding the latter in the operative locking position.
Figure 11:
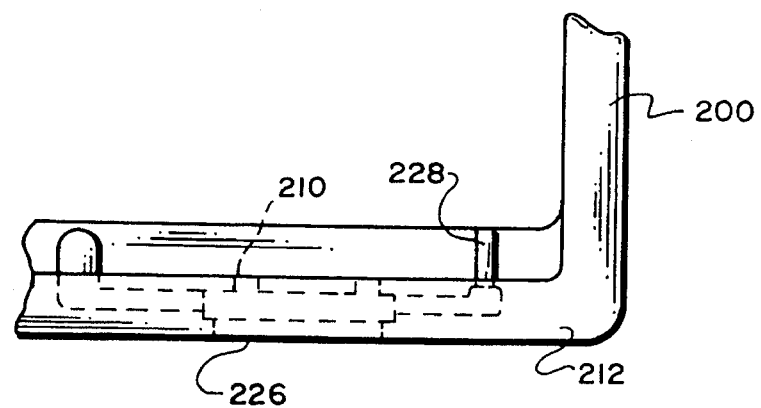
FIG. 11 is a fragmented plan view of a button in the wall of the adapter.
Figure 12:
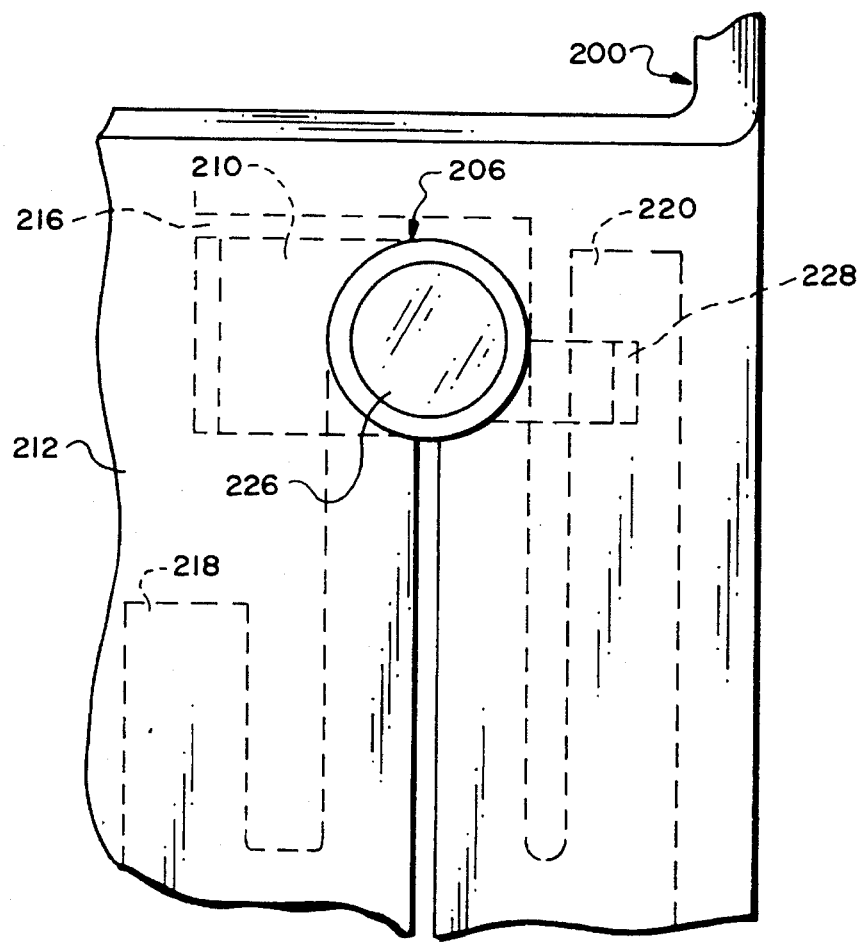
FIG. 12 is a fragmented side elevational view of the button.

The releasing assembly 206 has a main body portion 210 which is mounted for limited sliding movement in a front wall 212 of the adapter 200. The locking assembly 204 includes an integral locking member 214 having an elongated base 215 which is secured to a bottom inside portion of the front wall of the adapter. Extending from the base 215 is an upstanding leaf spring portion 216 which engages the button assembly 206 for biasing the latter forwardly or to the back of the wall 212. The locking member 214 includes a pair of shuttle biasing leaf springs 218 which bias the shuttle toward the adapter datums for properly locating the shuttle for film exposure. The locking member 214 also includes an upstanding escapement latch 220 having a bent shape, as shown, and including a latch opening 222 arranged to cooperate with an escapement tab 224 of the escapement mechanism 208. After the escapement mechanism has been moved to its fired position, the escapement tab 224 is in the phantom position shown in which it is moved through the opening 222 (FIG. 9). Accordingly, the shuttle cannot be withdrawn from the adapter. However, once a button segment 226 is pressed inwardly against the leaf spring 216, a latch engaging portion 228 engages the escapement tab 224 and displaces it in the opposite direction free of the latch opening 222, whereby the shuttle's shutter mechanism (not shown) can close in a manner which is described and claimed in the noted copending patent application. Of course, once the manual pressure is removed from the button segment 226, the leaf spring 216 urges the former outwardly and the portion 228 is removed from the latch opening.

It will be understood that the adapter cam 230 will be able to engage another tab 232 on the escapement plate of the escapement mechanism so as to drive the shutter of the shuttle to an open condition when the shuttle is inserted into the adapter as described in the noted copending application.

The present invention may be embodied in other specific forms without departing from the spirit or central characteristics thereof. The present embodiment, is therefore, to be considered in all respects as illustrative and not restrictive. The scope of the present invention being indicated by the appended claims rather than by the foregoing description and all changes which come within the meaning of the range of equivalency of the claims are therefore intended to be embraced therein.

What is claimed is:

1. Apparatus adapted to be mounted on an image recording apparatus and adapted for removably receiving therein a transport assembly which houses a photographic film cassette containing at least an instant developable film, the transport assembly being actuatable so that the film unit can be exposed while in the cassette, said apparatus comprising:

a housing assembly including means for securing said housing assembly to an image recording apparatus; receiving means for removably receiving therein a transport assembly containing a photographic film cassette; and an exposure aperture which allows the film unit to be exposed by the image recording apparatus when received within said receiving means;

blocking means coupled to said housing assembly and being operable in a first mode for normally blocking said exposure aperture, and being operable in a second mode in response to insertion of the transport assembly into said receiving means so as to unblock said aperture and allow exposure of a film unit, said blocking means being returnable to said first mode to reblock said aperture prior to removal of the transport assembly from said receiving means.

2. The apparatus of claim 1 further including actuating means cooperable with said housing assembly for actuating the transport assembly during insertion and removal of the transport assembly relative to said receiving means, whereby a film unit can be exposed after insertion of the transport assembly and exposure can be blocked upon removal of the transport assembly.

3. The apparatus of claim 2 wherein said actuating means includes projecting means mounted on said housing assembly for projecting into the path of movement of the transport assembly during movement of the latter into and from said receiving means so as to actuate the transport assembly during insertion and removal.

4. The apparatus of claim 1 wherein said blocking means includes:

protective curtain means mounted for movement on said housing assembly for movement between first and second positions corresponding to said first and second modes of said blocking means;

engaging means coupled to said curtain means and being engaged by a leading end portion of the transport assembly during insertion so as to move said curtain means to said second position; and, biasing means for biasing said engaging means and said curtain means whereby said curtain means moves to said first position upon removal of the transport assembly from said receiving means.

5. The apparatus of claim 4 wherein said curtain means includes a plurality of interconnected and relatively independently movable blade segments which are mounted on said housing assembly adjacent said aperture and operatively connected to each other for allowing individual sliding reciprocation therebetween, such that when said curtain means is in said first position said blade segments have been moved so as to block said aperture, and when in said second position said blade segments have been moved to unblock said aperture.

6. The apparatus of claim 5 wherein one of said blade segments includes a pair of axially spaced pin members, and the other of said blade members each includes a slot in which said pin members can travel for engaging said other blades so as to move them reciprocatably in response to reciprocating movement of said one blade member, wherein engagement by one of said pin members moves said other blades in one direction and engagement by the other of said pin members moves said other blades in an opposite direction to said one direction.

7. The apparatus of claim 5 wherein said one blade segment defines a first gear segment, and said housing assembly defines a stationary second gear segment, said engaging means includes a slider means which is mounted for reciprocating movement within said housing assembly, said slider means being biased to said first position and being engaged by the transport mechanism to move toward the second position, said slider means includes a pinion gear which meshes with said first and second gear segments to thereby transfer linear movement of said slider means to corresponding linear movement of said one blade segment.

8. The apparatus of claim 7 wherein said biasing means includes a spring member which is connected to and between said slider means and said housing assembly so as to urge said one blade segment to said first position.

9. The apparatus of claim 1 wherein said housing assembly further includes means for defining and controlling a path of movement of the transport assembly during insertion and removal of the transport assembly into and from said receiving means.

10. The apparatus of claim 1 wherein said housing assembly includes a locking assembly which positively locks the transport assembly therein and which is actuatable so as to unlock the shuttle assembly.

11. The apparatus of claim 10 wherein said locking assembly includes a latch which releasably latches an escapement mechanism of the transport assembly so as to restrain the transport assembly, said locking assembly including a release which is biased in one direction and is manually operated so that upon displacement against the biasing forces thereon said latch releases the escapement mechanism thereby freeing the transport for withdrawal from said apparatus.

12. A method of allowing exposure of a film unit and protecting an image recording apparatus, said method comprising the steps of:

providing an image recording apparatus having an aperture which allows exposure of a film unit carried by a film assembly;

providing an adapter with an aperture which is mounted on the image recording apparatus so that the adapter aperture and the image recording aperture are in registration and which adapter removably receives therein a film assembly containing at least a film unit to be exposed;

blocking the adapter aperture by blocking means carried by the adapter;

inserting the film assembly into the adapter so that the film unit is positioned to be exposed;

unblocking the adapter aperture by moving the blocking means to an unblocking position when the film assembly is in the adapter so that exposure can be taken; and, reblocking the adapter aperture by the blocking means prior to removal of the film assembly from the adapter.

13. The method of claim 12 further comprising the steps of:

actuating the blocking means automatically to its unblocking position when the film assembly is inserted in the adapter, and to its blocking position to terminate exposure so as to allow removal of the film assembly from the adapter and to have the blocking means block the aperture and protect the image recording apparatus after removal of the film assembly.

* * * * *